United States Patent [19]
Chow

[11] 3,786,192
[45] Jan. 15, 1974

[54] SHIFT CIRCUITS WITH OUTPUT CONTROL GATED BY COMBINED CONTROL MEMORY

[75] Inventor: Woo Foung Chow, Berkeley Heights, N.J.

[73] Assignee: Bell Telephone Laboratories, Incorporated, Murray Hill, Berkeley Heights, N.J.

[22] Filed: Oct. 11, 1972

[21] Appl. No.: 296,577

[52] U.S. Cl. .......................... 179/15 AQ, 340/174 TF
[51] Int. Cl. .......................... H04j 3/00
[58] Field of Search .......................... 179/15 AQ, 18 GF; 340/174 TF

[56] References Cited

UNITED STATES PATENTS 3,700,819 10/1972 Marcus .......................... 179/15 AQ
3,649,763 3/1972 Thompson .......................... 179/15 AQ

*Primary Examiner*—William C. Cooper
*Assistant Examiner*—David L. Stewart
*Attorney*—Charles Scott Phelan

[57] ABSTRACT

In a planar shifting technology time slot interchanger, a shift register has selectable output gates at different stages thereof, which gates are arranged to be actuated under the burden of predetermined restrictions. Those restrictions are such that in a numerical sequence of the gates along the shift register, a central gate, number $C_N$, is actuatable most frequently; and other gates at increasingly remote positions from the central gate in the sequence are actuatable with decreasing frequency. A control memory loop connected to control operation of one of the output gates is further connected to control operation of another output gate in the sequence on the same side of the central gate. The two gates so controlled have sequence numbers that, when considered modulo-$C_N$, are complementary with respect to $C_N$.

10 Claims, 9 Drawing Figures

SHIFT CIRCUITS WITH OUTPUT CONTROL GATED BY COMBINED CONTROL MEMORY

BACKGROUND OF THE INVENTION

1. Field of the Invention

This invention relates to planar shifting technology circuits and particularly to control memory arrangements for affecting patterns of operation of gating circuits associated with such shifting circuits.

2. Description of the Prior Art

Control gated, planar shifting technology circuits are found increasingly to be useful in time slot interchanging circuit arrangements. Accordingly, the present invention is herein described in such an arrangement, but its application is not so limited.

Time slot interchangers are generally arranged so that time division multiplex signals are shifted into a shift register; and in each time slot of a recurrent time division multiplex signal frame, a time slot signal is coupled out of a selectable stage of the shift register for application to a further time division multiplex circuit. For example, in the U.S. Pat. No. 3,172,956 of H. Inose and J. P. Runyon, a time slot interchanging scheme utilizing discrete circuit components is taught. Numerous subsequent disclosures by Inose and others have dealt with various improvements in the interchanging arrangement just outlined and in converse arrangements wherein signals are gated into selectable stages of a shift register and an output is derived from a common final stage of the register. In all cases, however, the gate selection function is performed by some type of control memory storage which is scanned in time slot sequence. In one type of interchanger circuits of the general class just described, control gate names are stored in plural locations of a control memory; and those locations are recurrently scanned in the interchanger output time slot sequence. In another type of interchanger, each gate has a full-frame loop shift register associated therewith to function as an individual control memory for that gate. It is this last type of interchanger arrangement which has been found to be particularly useful in the planar shifting technology.

In accordance with planar shifting technology, a so-called potential energy packet in the form of a magnetic field or an electric field is controllably moved in a particular type of substrate material. Thus, for example, magnetic single-wall domains, sometimes called bubbles, are movable in particular magnetic substrate materials by means of domain interaction in cooperation with magnetic overlays on the substrate and an in-plane rotating magnetic field or with electric fields produced by currents flowing in electric circuits deposited in particular configurations on the magnetic material. On the other hand, in charge coupled device (CCD) technology electric charges are movable in a stepwise fashion in a semiconductor material at least partially under the influence of fields produced by electric signals applied to electric circuit elements deposited on the semiconductor material. Stated more precisely, in CCD technology minority carriers (or their absence) are stored in spatially defined depletion regions (potential wells) at the surface of a homogeneous semiconductor, and such charge conditions are moved about the surface by moving the potential wells.

An illustrative time slot interchanger utilizing planar shifting technology is taught in a copending application Ser. No. 204,143, filed Dec. 2, 1971, for R. S. Krupp and L. A. Tomko, which application is entitled "Dynamically Switching Time Slot Interchanger," and is assigned to the same assignee as the present application. In a Krupp et al. type of time slot interchanger, a frame sized control memory loop shift register is associated with each interchanger input shift register output, or transfer, gate in order to operate that gate at the correct time in accordance with the time slot interchanging function which is to be performed. The gates couple the input register to corresponding stages of output shift register; and, in some embodiments, both registers are operated in a shifting mode while the transfer gates are being selectively actuated by their respective control memories. The Krupp et al. time slot interchanger is specifically illustrated by implementation in the magnetic single-wall domain technology. However, the concept of such a dynamically switching time slot interchanger is clearly also applicable in the charge coupled device (CCD) technology.

Two illustrations of shift registers and electrical input and output circuits therefor in the CCD technology are to be found in an article "Charge-Coupled Devices — A New Approach to MIS Device Structures" by W. S. Boyle and G. E. Smith which appeared at pages 18 through 27 of the July 1971 issue of the *IEEE Spectrum*, and in a paper entitled "A Simple Charge Regenerator for use with Charge-Coupled and Bucket-Brigade Shift Registers and the Design of Functional Logic Arrays" by M. F. Tompsett, a digest of which paper appears at pages 160 and 161 in the *Digest of Technical Papers* for the 1971 IEEE International Solid-State Circuits Conference.

It is apparent from the foregoing illustrative prior art references that planar shifting technology, time slot interchangers necessarily require many signal bit circuit locations. That is, such interchangers require many substrate locations for magnetic domains or electric charge packets as the case may be. Typically each bit location includes plural adjacent domain, or charge, locations through which a domain, or charge, moves in a full cycle of shift clock phases for the domain, or charge, propagation path involved. Although it is well within the capabilities of the planar shifting technology to implement time slot interchangers, it is nevertheless desirable to reduce the numbers of such bit circuit locations to as great an extent as may be possible in order to hold down equipment costs.

STATEMENT OF THE INVENTION

Accordingly, in the present invention a control memory loop shift register for a first data signal shift register output gate is also connected to control a second output gate of the same data signal shift register. That second gate is required by the nature of the cooperation of the control memory and the data signal shift register to be opened at times when the first output gate must be closed.

It is a feature of one embodiment of the invention that control memory loops for the various data shift register output gates constrain those gates to operate so that a central output gate, in a numerical sequence of gates along the shift register in the direction in which data signals are shifted through that register, is actuatable most frequently; and other output gates at increasingly remote positions in the sequence from either side of the central gate are actuatable with decreasing frequency.

It is another feature of the invention that any two gates which are controlled by a common control memory loop shift register have sequence numbers in the mentioned gate sequence which, when considered modulo-$C_N$, are complementary with respect to $C_N$.

It is another feature that a time slot interchanger utilizing the aforementioned data shift register as an input shift register has the number of bit location circuits reduced, for a case wherein the number of output time slots in a frame is greater than the number of input time slots in a frame, by employing two output shift registers which are operated at the same bit rate as the input shift register. Each output-gated stage of an input register is coupled to a corresponding stage of both output registers, and a pair of control memory loops control the gating arrangement to cause the output shift registers to be employed for different groups of the output time slots in each signal frame.

It is a further feature that a time slot interchanger utilizing the present invention is implemented in the CCD technology.

BRIEF DESCRIPTION OF THE DRAWINGS

A more complete understanding of the invention and various features, objects and advantages thereof may be obtained from a consideration of the following detailed description in connection with the appended claims and the attached drawings in which:

DETAILED DESCRIPTION

Figure 1:
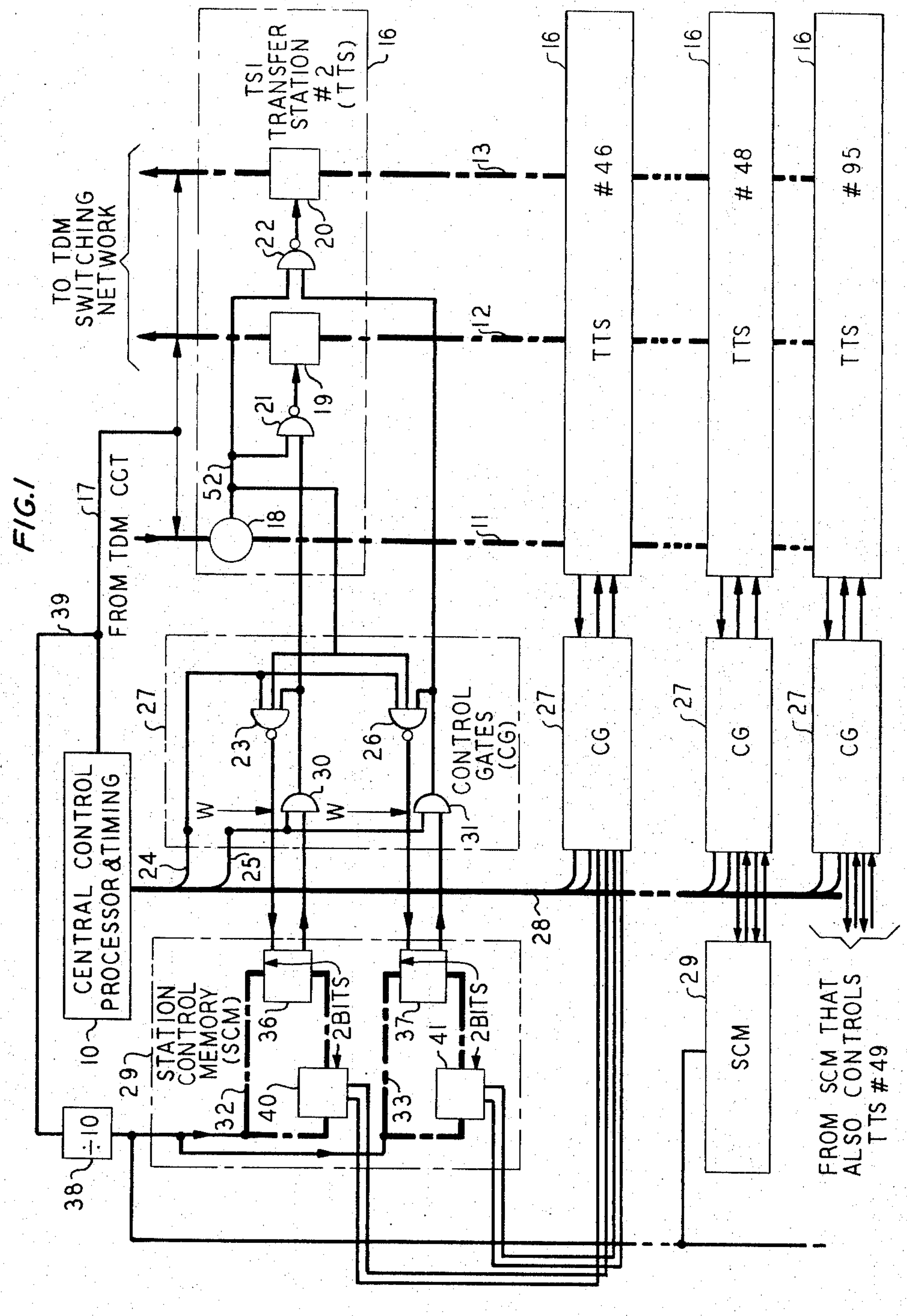
FIG. 1 is a simplified schematic diagram of a CCD time slot interchanger utilizing the present invention.

In FIG. 1 a planar shifting technology, time slot interchanger utilizing the present invention is illustrated in conjunction with a central control processor 10 which is utilized for controlling, and providing timing for, the operation of a time division multiplex telephone communication system in a manner which is now well known in the art and which comprises no part of the present invention. One illustrative time division communication system operated by a central control processor is disclosed in a J. S. Thompson U.S. Pat. No. 3,649,763. In such a system, circuit numbers and time slot numbers utilized by calling and called parties involved in a particular call connection are identified by appropriate equipment identification program or logic. That number information is utilized by the processor 10 to establish input and output time slot numbers utilized for that same call connection in the interchanger of FIG. 1. Furthermore, the processor also advantageously determines, from the latter input and output time slot numbers and the known configuration of the time slot interchanger, the time that must elapse after the input time slot before a particular one of the transfer coupling gates between shift registers must be activated in order to couple a signal from that input time slot to an interchanger output shift register, so that the signal will appear in the output of the latter register in the aforementioned output time slot.

The time slot interchanger of FIG. 1 is advantageously implemented in the charge coupled device technology, but the application of the principles of the invention is not so limited. An input shift register 11 receives time division multiplex signals from a time division circuit, not separately shown, and causes those signals to be coupled to one or the other of two output shift registers 12 and 13, in the same or different time slot signal order, through time slot interchanger transfer stations (TTS) 16. The transfer stations are further identified by numbers in a numerical sequence along the input register 11 and extending in the direction in which data signals are shifted through that register. Since those transfer stations are all the same, only the four stations numbered 2, 46, 48, and 95 are specifically illustrated in the drawing; and only the station No. 2 is shown in detail. The shift registers 11 through 13, and other shift registers to be hereinafter mentioned, are advantageously of the type disclosed in the aforementioned Tompsett paper. Such shift registers are schematically indicated in the drawing as broad broken lines to indicate the charge stepping type of function that takes place therein as distinguished from the charge flowing type of operation normally found in electric circuit wires, which wires are in the drawing indicated in the usual way by solid lines of normal breadth.

The time slot interchanger of FIG. 1 will be described in connection with an embodiment having 48 input time slots per frame and 96 output time slots per frame, with 10 data signal bits in each time slot signal. An interchanger of this type is illustrated in order to demonstrate the utility of the invention in complex circuit situations, and thus indicate that the invention is also useful in other gated-output shift register situations of various degrees of complexity. As is customary in dynamically switching time slot interchangers, the requirement for 96 output time slots indicates the employment of 95 of the transfer stations 16, which stations are spaced along the input shift register at 5-bit, i.e., half word, intervals.

Figure 8:
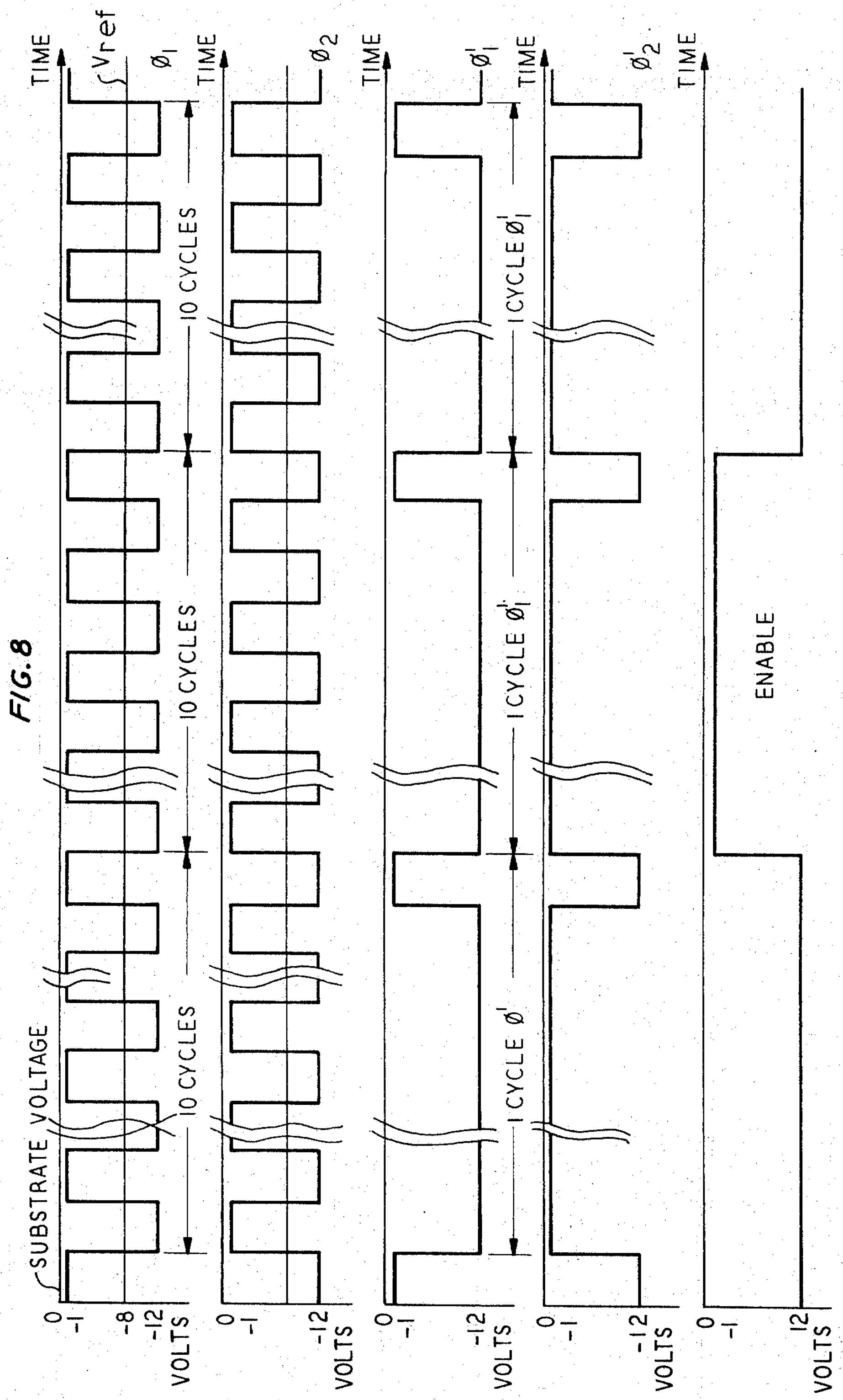
FIG. 8 is a set of timing diagrams for facilitating an understanding of the invention.

Central control processor 10 also provides clock timing signals for use in the operation of the time slot interchanger; and these signals are, in FIG. 1, provided on a circuit 17 to the shift registers 11 through 13. It is hereinafter assumed that shift registers of the 2-phase type are employed in the illustrative embodiment of FIG. 1. Two-phase clock pulses $\Phi_1$ and $\Phi_2$ as shown in FIG. 8, are available in adjacent time intervals and have a total duration of one time slot for an adjacent pair of such pulses. It is to be understood that the circuit 17 actually includes separate circuits for both of the mentioned phases extending along each of the shift registers 11 through 13.

Figure 3:
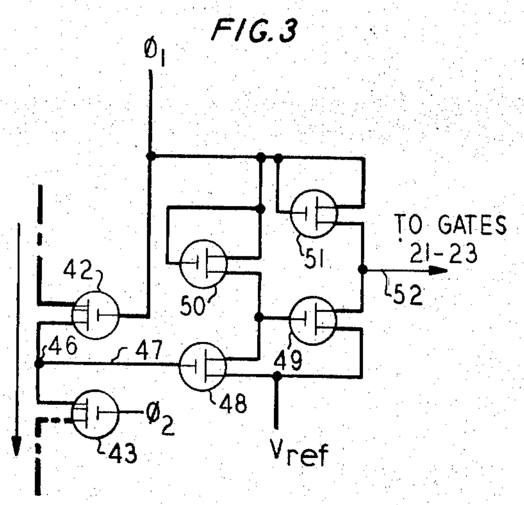
FIGS. 3, 4, and 5 are schematic diagrams of CCD reading and writing circuit combinations which are useful in the interchanger of FIG. 1.
Figure 4:
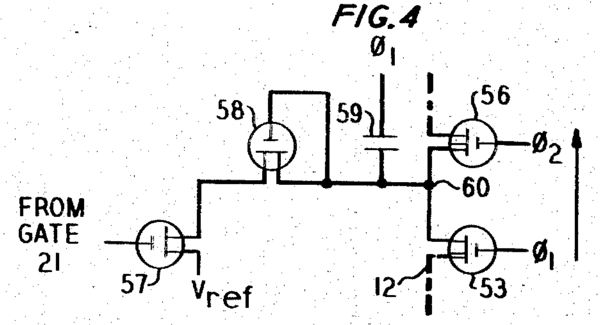

In each transfer station 16 a reading circuit 18, to be described in connection with FIG. 3, is included in the input shift register; and writing circuits 19 and 20, to be described in connection with FIG. 4, are included in the output shift registers 12 and 13, respectively. Data signals which are shifted through the reading circuit 18 in the register 11 also appear at inputs and NAND gates 21 and 22 which control writing circuits 19 and 20, respectively, and at enabling input connections of NAND gates 23 and 26 in an associated set 27 of control gates which will also be subsequently described.

Figure 2:
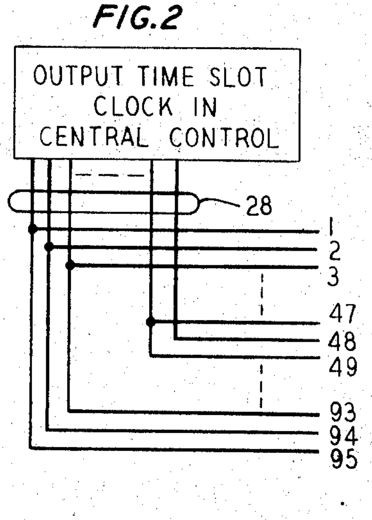
FIG. 2 illustrates control gate input circuit cabling for the interchanger of FIG. 1.

The various control gate sets 27 each receive two gate enabling signals from the central control processor 10 by way of a circuit cable 28. When so enabled, a control gate set can allow signal coupling in either direction between the associated transfer station 16 and an associated station control memory, such as one of the control memories 29. The enabling signals are available in only particular time slots of each frame for any given control gate set 27, as will be discussed in greater detail in connection with FIG. 7B. For the present it is sufficient to indicate that the control gate sets receive enabling signals from the cable 28 in pairs of gate sets as indicated in the partial schematic diagram of FIG. 2 wherein there is shown only one of the two circuits extending to each control gate set 27. Thus, the control gate sets 27 associated with transfer stations 1 an 95 are enabled by signals on the same circuit of cable 28. Similarly, control gates of station pairs 2-94, 3-93. . .47-49 are enabled together. The control gate set of the central transfer station No. 48 is enabled at a unique time slot and in certain cases one or more additional station control gate sets are also enabled in unique time slots, as will be subsequently discussed. Thus, apart from gate sets that are enabled in unique time slots, the sets are paired such that the two sets of a pair are equally distant in the transfer station sequence from opposite sides of the central station of the sequence.

Within a control gate set 27, such as the set which is illustrated in detail in association with transfer station No. 2, an enabling signal on a circuit 24 from the cable 28 enables both of the aforementioned NAND gates 23 and 26 which provide communication from the transfer station number 2 to the one of the station control memories 29 which is associated with that transfer station. The signal on circuit 24 is a positive-going pulse during the $\Phi_1$ phase of the first bit time in each time slot when the transfer station No. 2 is to be activated. In addition, two further coincidence gates 30 and 31 are enabled by a signal on a circuit 25 to provide communication from that same station control memory to the coincidence gates 21 and 22, respectively, in the transfer station No. 2. The signal on circuit 25 is advantageously a positive-going pulse during all $\Phi_1$ phases of a time slot when transfer station No. 2 is to be activated. The gates 30 and 31 provide output coupling from the station control memory to operate transfer station No. 2 in accordance with control signal information in the memory, and the gates 23 and 26 allow recirculation of those control signals into the memory during intervals when the control gate set 27 is enabled.

Each station control memory 29 includes in the illustrative embodiment two charge coupled device loop shift registers, one for controlling data signal transfer to each of the interchanger output shift registers 12 and 13, respectively, at the corresponding transfer station. Each loop includes 48 bit positions, for the illustrative embodiment of FIG. 1, and is dedicated for control of a different output shift register with respect to one half of the number of time slots of a frame. Each of the loops 32 and 33 includes a control interface circuit, or read/write station, for each transfer station 16 controlled thereby. Thus, loops 32 and 33 include read/write stations 36 and 37, respectively, which will be described in detail in connection with FIG. 5, and which provide control coupling to transfer station No. 2. Each read/write station allows charges to circulate in its respective shift register loop for representing a particular set of interchanger transfer station control information, and it also allows electric signal representations of those charges to be coupled in and out of the corresponding loop for appropriate utilization. Shift registers 32 and 33 operate advantageously at one tenth of the signal bit rate utilized by the shift registers 11, 12, and 13 in the illustrative embodiment because any control effected by a control loop must stand for a full 10-bit time slot. Likewise, the duration of each shift clock pulse is correspondingly longer. This shift clock rate relationship is indicated by a divide-by-10 circuit 38 which is included in a circuit 39 for coupling shift clock output signals from the processor 10 to the various loop shift registers in the station control memories 29. Circuit 38 supplies on separate leads (not separately shown) clock signals $\Phi_1'$ and $\Phi_2'$ illustrated in FIG. 8. $\Phi_1'$ is negative-going for 9½ time slots, and $\Phi_2'$ is the complement of $\Phi_1'$. Such clock signals are advantageously produced by counting down the shift clock rate employed in circuit 17 to obtain a signal for setting a bistable circuit that is thereafter reset after one pulse interval of the clock wave being counted.

In accordance with one aspect of the present invention, each of memory shift register loops 32 and 33 of most station control memories has a second read/write station, such as the stations 40 and 41, respectively, included in the shift register loop. Those second stations are coupled, in the same fashion illustrated for transfer station number 2, to control a different one of the transfer stations in the time slot interchanger. The two transfer stations controlled by the two read/write stations in any one shift register loop of a station control memory are advantageously both on the same side of the central transfer station number $C_N$ (number 48 in the illustrative embodiment) in the sequence of interchanger transfer stations. In addition, the sequence numbers modulo-$C_N$ of the two transfer stations, which are controlled by a common station control memory shift register loop, are complementary with respect to the sequence number of that central station. For example, in FIG. 1 the read/write stations 36 and 40 in memory loop 32 provide interface control coupling for interchanger output register 12 at transfer station Nos. 2 and 46. Similarly, read/write stations 37 and 41 in memory loop 33 provide interface control coupling to interchanger output register 13 in the same transfer station Nos. 2 and 46. In like manner, transfer station Nos. 1 and 47 (not shown) are both controlled by a common one of the station control memories 29 and station Nos. 3 and 45 (not shown) are controlled by a different one of the memories 29. Likewise, considering transfer stations on the high side of the central station 48, the station Nos. 49 (not shown) and 95 are controlled by another one of the station control memories 29.

Each read/write station comprises one bit location in its memory loop. All read/write stations in any given control memory loop are spaced by a number of bit locations (each including the appropriate number of charge packet locations for the charge propagation path of the loops) which is equal to the sequence number modulo-$C_N$ of the smaller of the two complementary transfer station numbers of stations controlled by that loop. The term "spaced" here has reference to the shift register span, in numbers of bit locations, from a given point in one location to a corresponding point in another location. This spacing assures absence of interference in transfer station operation by improper control memory information, and the assurance arises from the fact that the operate times for that station with the smaller number must be adjacent times as will be evident from subsequent consideration of FIGS. 7A and 7B. Larger station spacings can be employed but specialized counting apparatus is then needed to keep track of the stored control information.

In FIG. 3 there is shown a schematic diagram of one form of read circuit which is useful for the read circuit 18, in FIG. 1, and for the readout portion of a read/write station such as the station 36. In FIG. 3 and in other figures, the insulated gate field effect transistor (IGFET) schematic symbol is utilized to represent both the transistors employed in the electric circuit part of the read circuit and the potential wells in the charge coupled device shift register path since the functions performed by an IGFET and at a potential well in the shift register are similar in many respects. However, transistors representing potential wells have in their schematic representation an extra line adjacent to the source connection. Thus, in FIG. 3 transistors 42 and 43 represent adjacent potential well positions (comprising a bit location) in the shift register 11 in the sequence of signal propagation indicated by the arrow to the left of the shift register in the drawing. Shift clock phase signals $\Phi_1$ and $\Phi_2$ provided by processor 10 on the shift clock circuit 17 of FIG. 1 are applied to gate electrodes of transistors 42 and 43, respectively. These shift clock signals are negative-going signals which allow current conduction in an electric circuit IGFET and which allow charge in a charge coupled device to move from a preceding potential well in the charge propagation path to a new potential well in the same path. Such a potential well is considered to lie under the drain electrode of the IGFET schematic representation. Thus, the occurence of the $\Phi_1$ shift clock signal allows a charge to flow downward in FIG. 3 through source and gate regions of the IGFET 42 to rest in a new potential well position under the drain electrode of the transistor. Also advantageously associated with the same region of the shift register is a sensing diffusion such as that described in the aforementioned Tompsett paper and which is schematically represented by a circuit junction 46 in a metallic circuit connection between the drain of transistor 42 and the source of transistor 43 in FIG. 3. Such a sensing diffusion allows an electrical sensing of the presence or absence of a charge in the indicated potential well. Thus, if a charge is present in the well, an electrical circuit 47, which is connected to the sensing diffusion 46, is found to be at a first voltage; and if a charge is absent, the circuit 47 is at a lower voltage.

Four additional IGFETs 48, 49, 50, and 51 are connected to comprise a duplicate inversion circuit for coupling electrical signals on the circuit 47 to an output circuit 52 which is connected to NAND gates 21 and 23 in FIG. 1. Transistors 50 and 51 have their gate electrodes connected to their respective drain electrodes to form semiconductor resistors in a manner well known in the art; and those drain electrodes are connected together to the circuit which supplies the $\Phi_1$ shift clock signal. Transistors 48 and 49 are connected between a terminal of a reference voltage source $V_{ref}$, which has its other terminal grounded, and the source electrodes of transistors 50 and 51, respectively. That reference voltage advantageously has a magnitude which lies between the negative-going magnitude of a shift clock pulse and the remaining positive-going portion of the shift clock signal. This relationship is illustrated on the $\Phi_1$ diagram in FIG. 8. In addition, the drain electrode of transistor 48 is cross-coupled to the gate electrode of transistor 49 and the output circuit 52 is coupled to the connection between transistors 49 and 51.

Thus, if a charge is present at the drain electrode of transistor 42, circuit 47 is in its high voltage state and biases transistor 48 to a nonconducting condition. The negative-going $\Phi_1$ shift clock pulse which brought that charge to the indicated position is also coupled through transistor 50 to the gate electrode of transistor 49. The latter transistor conducts and the resulting current through transistor 51 develops a positive-going voltage on the output circuit 52 for enabling the NAND gates 21 through 23 and 26 in FIG. 1. Similarly, if at the time of the $\Phi_1$ shift clock signal there had been no charge at the drain electrode of transistor 42, the circuit 47 would have been in its low voltage condition to enable transistor 48 and thereby develop a voltage across transistor 50 to hold transistor 49 in a nonconducting condition. In that state of affairs, the negative-going potential of the $\Phi_1$ shift clock signal appears on the output circuit 52.

Upon the occurrence of the $\Phi_2$ shift clock pulse, immediately at the termination of the $\Phi_1$ pulse any charge that had been at the drain electrode of transistor 42 in FIG. 3 moves downward in shift register 11 to a corresponding well under the drain electrode of transistor 43. At that time, the signal on the $\Phi_1$ shift clock circuit is high and also appears on output circuit 52 so that gates 21 through 23 in FIG. 1 remain enabled during every $\Phi_2$ clock pulse, i.e., until the start of the next $\Phi_1$ pulse and whether or not there is a charge under the drain electrode of transistor 42.

Returning for a moment to FIG. 1, it will be seen that, when the output circuit 52 of read circuit 18 is high, and if a control gate enable signal is provided from cable 28, control gates 23 and 26 are enabled to provide recirculation of control signals from the output of gates 30 and 31, respectively, back to the writing portions of read/write stations 36 and 37, respectively. In addition, the same signal on output circuit 52 enables gates 21 and 22 to receive the output of the gates 30 and 31, respectively, for applying control signals from one of the control memory loops 32 or 33 to the corresponding one of the write circuits 19 or 20.

FIG. 4 illustrates a write circuit which is useful for the circuits 19 and 20 and for the write-in portions of the read/write stations, such as the stations 36 and 37. A portion of shift register 12, including write circuit 19, is illustrated in FIG. 4 and includes transistors 53 and 56 to represent the adjacent potential well positions of a bit location in the register. A high output from NAND gate 21 in FIG. 1 indicates that a binary ZERO signal is to be transferred in the interchanger from register 11 to register 12 at station No. 2. That signal appears at the gate electrode of a transistor 57 in FIG. 4 and blocks conduction in the transistor. Thus, during the occurrence of the corresponding shift clock pulse $\Phi_1$ there is no change in the sequence of charges propagated upward in shift register 12.

On the other hand, a low voltage signal at the gate electrode of transistor 57 during a $\Phi_1$ shift clock pulse indicates that a binary ONE signal is to be transferred and allows conduction through the transistor. The current flows from the reference voltage source $V_{ref}$ through an additional resistor-connected transistor 58 to charge a capacitor 59 through the $\Phi_1$ shift clock circuit. Capacitor 59 has a capacitance approximately the same as the drain-gate capacitance of IGFET 53. As soon as that capacitor has been charged, the same signal is coupled to an electric circuit member 60, which overlies the drain electrode of transistor 53, for charging the drain-gate capacitance of that transistor and thereby injecting a charge into the potential well at the drain electrode during the $\Phi_1$ shift clock pulse. It is noted that the member 60, which is included in a metallic connection between transistors 53 and 56, cooperates with transistor 53 as a source of charge to write binary signals into the shift register 12 at IGFET 56. Charging current flow ceases when the mentioned drain-gate capacitance becomes fully charged. Upon the occurrence of the succeeding $\Phi_2$ shift clock pulse, the charge thus injected, and the charge on the capacitor 59, move upward in register 12 to a new potential well at the drain electrode of transistor 56. In addition, the removal of the $\Phi_1$ shift clock pulse disables transistor 58, and opens the electric current conduction path therethrough.

Figure 5:
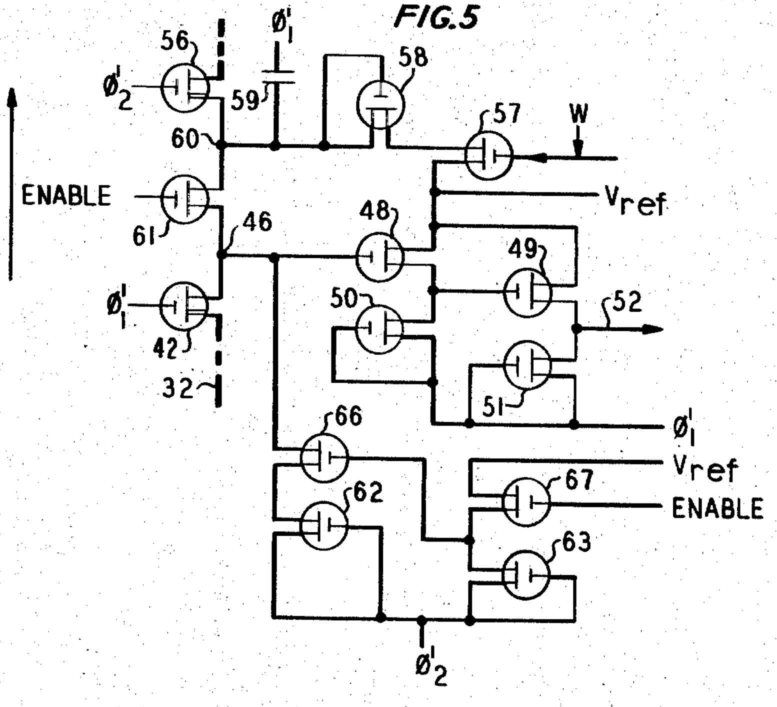

In FIG. 5 there is shown a schematic diagram of a read/write station such as the station 36 in memory loop 32 of FIG. 1. Such a station must include any suitable circuits for coupling signals out of the memory loop to the control gate set 27, for receiving signals from the control gate set 27 to effect recirculation of control information, and for receiving signals from the associated write circuit W, to be described in connection with FIG. 6, for changing the control memory loop contents as directed by central control processor 10 to effect a change in a call connection. Basically the circuit of FIG. 5 advantageously employs back-to-back read and write circuits of the type illustrated in FIGS. 3 and 4 but with a few changes to accommodate the particular needs of a read/write station. The extent of this similarity is indicated in FIG. 5 by the employment of reference characters which are the same as, or similar to, those utilized in similar circuit elements in FIGS. 3 and 4. For example, primed reference characters on shift clock pulse leads indicate the use of the modified clock pulses from divide-by-10 circuit 38 in FIG. 1.

The combination of separate read and write circuits is accomplished by connecting a read station and a write station successively in the sequence of propagation in a memory loop shift register, such as the register 32, to comprise a bit location of the register. This combination no longer requires the use of separate read circuit transistor 43 and a separate write circuit transistor 53. Those transistors are replaced in FIG. 5 by a single enable transistor 61. This latter transistor is of the conventional type and has its source-drain path included in series in the shift register 32 in a metallic circuit between transistor 42 and 56. The gate electrode of transistor 61 is connected to receive an enable signal, illustrated in FIG. 8. That enable signal is produced, for example, by a bistable circuit (not shown) that is set and reset by successive negative-going transitions of the $\Phi_1'$ clock signal when the control gate set 27 associated with the same station of FIG. 5 is enabled by signals on its circuit 35 from cable 28. Thus, when the enable signal is low the associated control gate set 27 is disabled, transistor 61 is biased for conduction and charge can flow directly from transistor 41 to transistor 56. When the enable signal is high, i.e., when the associated control gate set 27 is enabled as previously described, transistor 61 is disabled and charges in shift register 32 can no longer flow directly from transistor 42 to transistor 56 through the transistor 61. With transistor 61 blocked, the presence or absence of charge at the drain electrode of transistor 42 is indicated by the sensing diffusion 46; and the voltage condition on read output circuit 52 is correspondingly controlled. As already described in this case, the signal on output circuit 52 is coupled as an enabling input signal to the AND gate 30 in the associated control gate set 27. Similarly, recirculation control signals received from the NAND gate 23 are applied to the gate electrode of transistor 57 for writing back control information at the gate member 60 in the writing portion of the read/write station.

It should be observed at this point that the busy bit technique indicated in the aforementioned Krupp et al. application and described in greater detail in a copending application of R. S. Krupp Ser. No. 212,348, filed Dec. 27, 1971, entitled "Busy Bit for Time Division Multiplex Signals to Reduce Signal Processing Time," assigned to the same assignee as the present application, and now Pat. No. 3,743,789 can be employed in the time slot interchanger arrangement herein presented. In the busy bit technique each time slot signal character includes one bit in the binary ONE condition if the time slot is in use in a call connection, and that bit is in the binary ZERO condition if the time slot is not so used. Among other functions, the busy bit is employed for conveniently erasing corresponding control memory signals without the necessity for substantial intervention by the central control processor.

Thus, if a busy bit is employed in the time slot interchanger of FIG. 1, it would advantageously appear in the first bit time of the time slot. Although that bit is not present for the full time slot, its presence during one bit interval, i.e., the beginning of the negative-going part of a $\Phi_1'$ interval, is sufficient for accomplishing any necessary alteration in the control memory loop bit corresponding to that time slot. Thus, if the busy bit is a binary ONE, gate 23 is actuated and applies a negative-going signal to the gate electrode of transistor 57 in FIG. 5. The original control information is written back into the capacitor 59 and drain of transistor 61 in FIG. 5 thereby ensuring recirculation of control information in loop shift register 32 during the $\Phi_1'$ shift clock pulse utilized in FIG. 5. Actually, the busy bit disappears after the first one tenth of the $\Phi_1'$ clock pulse interval and thereby disables gate 23; but by that time the rewrite charge has already been established. However, if the busy bit had been a binary ZERO, control gate 23 would not be enabled by the busy bit, and recirculation of control information from circuit 52 in FIG. 5 through gates 30 and 23 in FIG. 1 to transistor 57 in FIG. 5 would be inhibited.

It is useful to note at this point that if the enable signal is applied in FIG. 5 when the control memory indicates that a time slot interchanger transfer should take place, but there is no binary ONE busy bit, the control memory is erased for that time slot for lack of recirculation; and no transfer can then take place in corresponding future time slots. If the enable signal is applied and the control memory indicates that no transfer should take place, the enable transistor 61 is blocked so that there can be no control signal recirculation directly through that transistor; and the low voltage output at circuit 52 in FIG. 5 prevents control signal recirculation through the control gate set 27. In other words, a ZERO, or no charge, is written. The shift clock signals continue to propagate other control signals in the loop register 32 so that there is no change in the phase or condition of those signals corresponding to other time slot intervals.

Under certain conditions, it is necessary to force a binary ZERO condition in a control memory loop register. The read circuit portion of FIG. 5 performs a nondestructive readout of a charge packet at transistor 42. The type of write circuit illustrated in the read/write station of FIG. 5 is able to write either a binary ONE signal or a binary ZERO signal at transistor 56 in the associated charge coupled device shift register, but it is unable to erase a charge packet representing a binary ONE condition at the drain electrode of transistor 42. For example, either during control information recirculation through a control gate set 27, or at a time when a busy bit indicates that a control signal ONE should be erased, there has yet been no way provided to remove the packet of charge representing that ONE signal at the drain electrode of transistor 42. In order to accomplish that removal, transistors 62, 63, 66, and 67 are provided in FIG. 5.

Transistor 67 receives at its gate electrode the same enable signal applied to transistor 61. That signal, when high, i.e., when gate set 27 is enabled, blocks transistor 67 and thereby prevents conduction from the reference source $V_{ref}$ through the transistor and through the resistor-connected transistor 63 to the $\Phi_2'$ shift clock circuit. This allows a negative-going $\Phi_2'$ signal to be applied through the transistor 63 to the gate electrode of transistor 66 for enabling a conduction path through that transistor and a resistor-connected transistor 62 from the sensing diffusion 46 to the $\Phi_2'$ circuit. Conduction in this path at the end of a FIG. 5 enabling interval depletes the charge packet which represented the binary ONE control signal at the drain electrode of transistor 42 during $\Phi_2'$ and when the ENABLE signal opens the transistor 61. When the enabling signal is removed, i.e., changes to the more negative voltage condition, transistor 67 is actuated and allows conduction through transistor 63 to develop a positive-going voltage which blocks transistor 66.

This erasing operation just described can also be used if necessary during operations when a control memory is being written by signals from the processor 10. But for any given time slot in the control memory loop register, a previously existing ONE signal would usually have been erased, at the end of a message, as described before, at the $\Phi_2'$ pulse time of the final utilization thereof. Consequently, the time slot position is clear at transistors 42 and 56 for the subsequent writing of new information from the processor 10.

Figure 6:
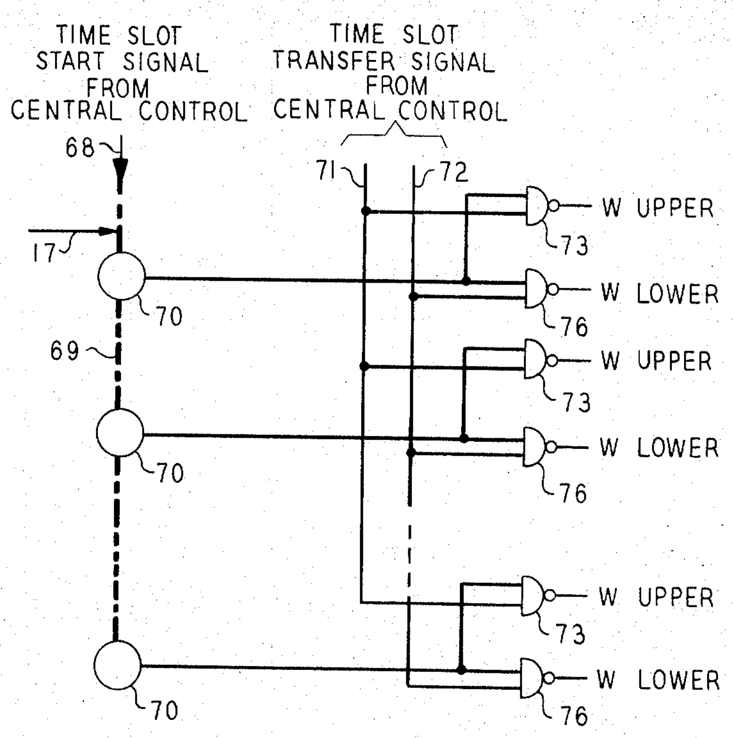
FIG. 6 is a schematic diagram of one logic arrangement for writing control signals into control memory loops of the interchanger in FIG. 1.

FIG. 6 illustrates one type of arrangement that is advantageously employed for writing control memories with information derived from processor 10. The writing technique is similar in concept to that previously described in a copending application of a P. I. Bonyhard application Ser. No. 214,269, filed Dec. 30, 1971, entitled "Time Division Multiplex Network Switching Unit," assigned to the same assignee as the present application, and now Pat. No. 3,751,597. The writing circuit operation is coordinated by timing and information signals provided from processor 10 in FIG. 1. At the beginning of the time slot when a time slot signal for a new call connection is to enter input shift register 11 in FIG. 1, a signal on a circuit 68 from processor 10 injects a charge into a charge coupled device shift register 69. The latter register is of the same type and size as the register 11 and is operated by the same shift clock signals on circuit 17. Register 69 also includes read circuits 70 interspersed along the register 69 at intervals which are the same as the intervals at which transfer stations are spaced in FIG. 1. Circuits 70 are clocked by the $\Phi_1$ and $\Phi_2$ signals.

During the propagation of the injected charge along the register 69, and in a time slot in which processor 10 has determined that a transfer should take place for the mentioned new call, between input register 11 of FIG. 1 and one of the output registers 12 or 13, processor 10 applies a time slot transfer pulse to one of two circuits 71 or 72 in FIG. 6. The particular one of those two circuits, that is so pulsed, depends upon whether the transfer time slot is in the beginning half or the ending half of a frame, i.e., it depends upon whether the transfer gate in the particular transfer station is controlled by the upper or the lower one of the control memory loops (as illustrated in FIG. 1) in the station control memory 29 for that transfer station. Circuit 71, when pulsed, enables a set of NAND coincidence gates 73 which have output connections on circuits W to connections in control gate sets 27 which drive the writing portions of control memory read/write stations in upper loops. Similarly, a pulse on circuit 72 enables a set of gates 76 which have outputs coupled to read/-write stations in lower register loops of the station control memories. One of the gates 73 or 76 which is thus enabled by the processor also receives a positive signal from its associated read circuit 70 of shift register 69. Output circuits W from a pair of the gates 73 and 76, which are driven by the same one of the read circuits 70, are extended to outputs of gates 23 and 26, respectively, in a control gate set associated with an interchanger transfer station corresponding to the read station 70 driving the gate pair 73, 76. The type of writing operation described takes place during coincidence of shift clock pulses $\Phi_1$ and $\Phi_1'$ since that is when output is available from station 70 and transistor 57 in FIG. 5 is enabled to charge capacitor 59 and the drain region of transistor 61.

Figure 7A:
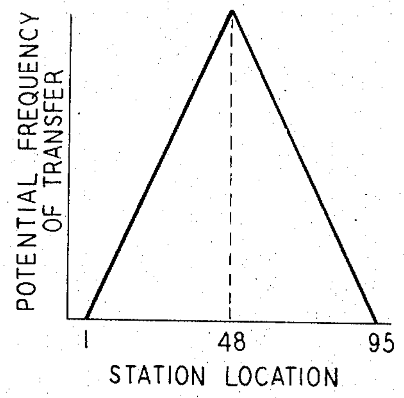
FIGS. 7A and 7B are diagrams of operating characteristics of the interchanger of FIG. 1 for facilitating an understanding of the present invention.

In the normal time slot interchanger operation for the illustrated type of time slot interchanger, it can be shown that the potential frequency of interchanger transfer station utilization during a given interchanger output signal frame is represented by the diagram of FIG. 7A, which is a plot of potential frequency of transfer station utilization versus station location in the interchanger. The symmetrical characteristic indicated in FIG. 7A occurs because the nature of a dynamically switching time slot interchanger is analogous to an operation wherein a frame of time division multiplex signals and a frame of empty time slots are moved past one another in opposite directions, and time slot transfer stations are operated so that it is possible to transfer any input time slot signal into any one of the empty output time slots. Thus, the central transfer station of the interchanger has the maximum potential frequency of utilization as compared to other transfer stations of the interchanger. For example, in the situation wherein the input time slot sequence and the output time slot sequence of the interchanger are to remain exactly the same, the central transfer station, i.e., number 48, is utilized in every time slot and other transfer stations would not be utilized at all. Use of any earlier transfer station for the last mentioned transfer sequence could allow insertion of signals into the end of a prior time slot. The potential frequency of transfer station utilization decreases on either side of the center station until reaching the first and last stations of the sequence for which the potential utilization is unity.

Figure 7B:
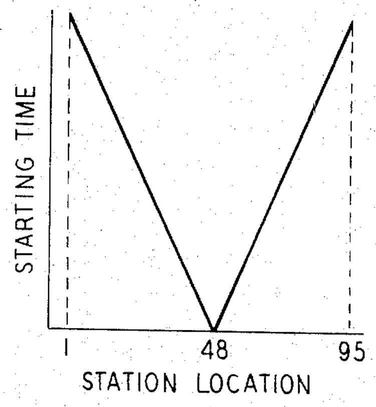

It can be further shown that the starting times in a frame of utilization of the various transfer stations have a distribution characteristic, as illustrated in FIG. 7B, which is a plot of starting time versus station location in the transfer station sequence. That plot shows that stations on the same side of the central station have different starting times, but stations equally distant from the central station in the station number sequence have like starting times. Starting time in FIG. 7B is measured in half-word times, i.e., in intervals equal to the duration of one-half of a time slot, from the time at which an input signal frame in register 11 of FIG. 1 meets an outgoing frame of empty time slots at the central transfer station 48. Pictorially, the time is sometimes equivalently considered to be in numbers of overlapping words of those two frames.

Considering the characteristics of FIGS. 7A and 7B together, it is seen that on any given side of the central station in the transfer station sequence the stations can be paired, to the extent that pairs are available, so that one station of a pair can be operated only at times when the other station of the same pair cannot be operated. This relationship is also indicated by the fact that the sequence numbers modulo-$C_N$ of paired transfer stations on any one side of the central station number $C_N$ are complements of one another with respect to $C_N$. Furthermore, it has been found that the sequence number of the station, having the smaller of two paired complementary numbers, modulo-$C_N$, defines the number of bit intervals that must be provided in a control memory loop shift register between read/write stations in that register which provide control signals for paired transfer stations. Thus, referring back to FIG. 1, transfer stations 2 and 46 are paired together; and two bit positions are provided in the loop register 32 between the read/write stations 36 and 40. The same spacing is utilized between the stations 37 and 41 in loop register 33.

Although the present invention has been described in connection with a particular embodiment thereof, it is to be understood that additional embodiments and modifications thereof which will be apparent to those skilled in the art are included within the spirit and scope of the invention.

What is claimed is:

1. In combination, a data signal shift register having plural stages, means for deriving output signals from selectable stages of said shift register, said deriving means comprising at least one different output gate at each of said selectable stages, said gates being selectively actuatable for providing gated-output signals from their respective shift register stages, each gated-output stage and its output gates having a numerical position in a sequence of the gated-output stages, said sequence being the sequence in which data signals are shifted through the gated-output stages of such shift register, and means for storing control signal information for controlling actuation times of said gates, said storing means comprising for at least one pair of said gated-output stages, a loop shift register, first means for coupling out of a first location in said loop shift register control signals to control a first one of said gates at least partly in response to said control signal information, and second means for coupling out of a second location in the same loop shift register control signals for similarly controlling a second one of said gates, said first and second gates being both on the same side of a central gate number $C_N$ in said sequence of such gates, and the sequence numbers, when considered modulo-$C_N$, of said first and second gates being complements of each other with respect to $C_N$.

2. The combination in accordance with claim 1 in which at least one additional data shift register is provided having the same number of stages as the first-mentioned data shift register, means are provided for operating all of said data shift registers at the same signal bit rate, and means are connected to the output of each output gate of said first-mentioned data shift register for coupling data signals from a stage of such register via such gate to a corresponding stage of said additional data shift register in accordance with said control signal information.

3. The combination in accordance with claim 1 in which said first and second coupling means each comprises a coupling circuit interposed between successive stages of said loop shift register, and said first and second locations are spaced by a number of loop shift register stages equal to the sequence number of the smaller one of the complementary transfer station numbers of stations controlled by such loop shift register.

4. The combination in accordance with claim 1 wherein said data signals are multibit time slot signals of a time division multiplex signal train, and means are provided for operating said data signal shift register at a bit rate which is greater than the operating bit rate of said storing means loop shift register by a factor which is equal to the number of bits in one of said time slot signals.

5. The combination in accordance with claim 1 in which, said deriving means comprises at least two additional data shift registers of the same size as the first-mentioned data shift register, one of said output gates being provided at each of said gated-output stages for each of said additional shift registers, means for connecting outputs of a first set of said output gates at each gated-output stage of said first-mentioned shift register to couple data signals to a corresponding stage of a first one of said additional shift registers, gates of said first set being connected to be controlled by said first and second coupling means of said loop shift register for such stage, and means for connecting outputs of a second set of output gates at gated-output stages of said first-mentioned shift register to couple data signals to corresponding stages of a second one of said additional shift registers, said storing means further comprises plural sets of said loop shift register and said first and second coupling means therefore, each set coupled to different pairs of gates of said first set of output gates, and in association with each said set of first-mentioned loop shift register and first and second coupling means, an additional set of a like loop shift register and third and fourth means for similarly coupling outputs of first and second spaced locations, respectively, in said like loop shift register to control gates of said second output gate set, each first mentioned loop register and associated like register storing signals for operating gates of said second set at times which are different from operating times of gates of said first output gate set, and means are provided for operating all of said data shift registers at the same signal bit rate.

6. The combination in accordance with claim 5 in which said data and storing means shift registers are charge coupled device shift registers.

7. The combination in accordance with claim 1 in which said storing means includes a plurality of said loop shift registers, said first and second coupling means each includes a control gate coupled between an output of such loop and an output gate of said data shift register, and means are provided for enabling different pairs of said control gates to be actuated by outputs from their storing means loop registers in different sized groups of time slots in each of plural recurring time frames, each control gate pair including gates equally spaced from opposite sides of said central gate in said sequence.

8. The combination in accordance with claim 7 in which said first and second coupling means each includes a recirculation gate coupled between an output of said data shift register and such loop to control signal recirculation in the loop in response to signals in said data shift register, and said enabling means includes means for enabling the recirculation gate of each loop at the same times as the control gate of that same loop.

9. The combination in accordance with claim 1 in which said data and storing means shift registers are charge coupled device shift registers.

10. The combination in accordance with claim 9 in which each of said first and second coupling means comprises means for indicating whether or not a charge is present in said loop shift register at such coupling means, means for controllably storing a charge in said loop shift register at such coupling means, and means for erasing any charge at said indicating means prior to operation of said controllable charge storing means.

* * * * *